United States Patent
Inclán et al.

(10) Patent No.: US 10,480,372 B2
(45) Date of Patent: Nov. 19, 2019

(54) MIXER IN AN EXHAUST GAS SYSTEM

(71) Applicant: Tenneco GmbH, Edenkoben (DE)

(72) Inventors: Tobias Inclán, Wissembourg (FR); Thomas Kremer, Neustadt-Duttweiler (DE); Eric Hein, Neustadt-Diedesfeld (DE)

(*) Notice: Subject to any disclaimer, the term of this patent is extended or adjusted under 35 U.S.C. 154(b) by 87 days.

(21) Appl. No.: 15/578,564

(22) PCT Filed: May 30, 2016

(86) PCT No.: PCT/EP2016/062180
§ 371 (c)(1),
(2) Date: Nov. 30, 2017

(87) PCT Pub. No.: WO2016/193221
PCT Pub. Date: Dec. 8, 2016

(65) Prior Publication Data
US 2018/0156092 A1      Jun. 7, 2018

(30) Foreign Application Priority Data

Jun. 1, 2015   (DE) .................. 10 2015 108 655

(51) Int. Cl.
*F01N 3/20*     (2006.01)
*F01N 3/28*     (2006.01)

(52) U.S. Cl.
CPC ......... *F01N 3/2066* (2013.01); *F01N 3/2892* (2013.01); *F01N 2240/20* (2013.01);
(Continued)

(58) Field of Classification Search
CPC .. F01N 3/2066; F01N 3/2892; F01N 2240/20; F01N 2470/04; F01N 2470/18;
(Continued)

(56) References Cited

U.S. PATENT DOCUMENTS 9,587,543 B2    3/2017  Haverkamp et al.
2014/0334988 A1  11/2014  Stanavich et al.
(Continued)

FOREIGN PATENT DOCUMENTS

DE    202007010324 U1    11/2008
DE    102011120685 A1    7/2012
(Continued)

*Primary Examiner* — Brandon D Lee
(74) *Attorney, Agent, or Firm* — Harness, Dickey & Pierce, P.L.C.

(57) ABSTRACT

The disclosure refers to a static mixer for use in an exhaust system for a combustion engine and for the mixing of an additive injected into an exhaust system. The mixer consists of a tubular housing encircling a central axis X. The housing comprises an input opening at the end in the direction of central axis X and at the opposite end an outlet opening, whereby the inlet opening is used for the supply of additive injected into the exhaust system. The housing is closed in the section of the inlet opening and in the section of the outlet opening in circumferential direction around the central axis X. The static mixer is designed to generate little counter-pressure, to guarantee rapid and complete reducing agent preparation and at the same time to be resistant to production tolerances. For this purpose, housing forms a tubular segment related to an XY plane parallel to central axis X of mixer and at right angles to a main flow direction S downstream of the XY plane, which features several openings as perforations orientated in radial direction to central axis X and a tubular segment downstream of the XY plane which features a recess in which several guiding plates are arranged.

15 Claims, 2 Drawing Sheets

(52) U.S. Cl.
CPC ...... *F01N 2470/04* (2013.01); *F01N 2470/18* (2013.01); *F01N 2610/00* (2013.01); *F01N 2610/02* (2013.01); *Y02T 10/24* (2013.01)

(58) Field of Classification Search
CPC ... F01N 2610/00; F01N 2610/02; Y02T 10/24
See application file for complete search history.

(56) References Cited

U.S. PATENT DOCUMENTS

| | | |
|---|---|---|
| 2015/0044103 A1 | 2/2015 | Sampath et al. |
| 2015/0275728 A1 | 10/2015 | Braun et al. |

FOREIGN PATENT DOCUMENTS

| | | |
|---|---|---|
| DE | 112012000035 T5 | 9/2013 |
| DE | 102012209087 A1 | 12/2013 |
| DE | 102012021017 A1 | 4/2014 |

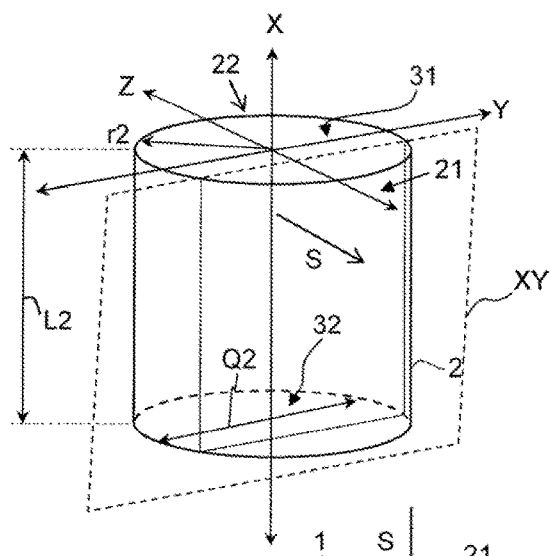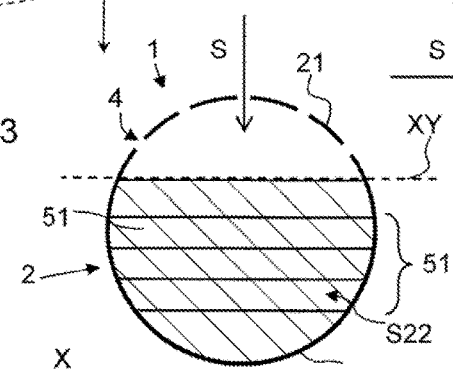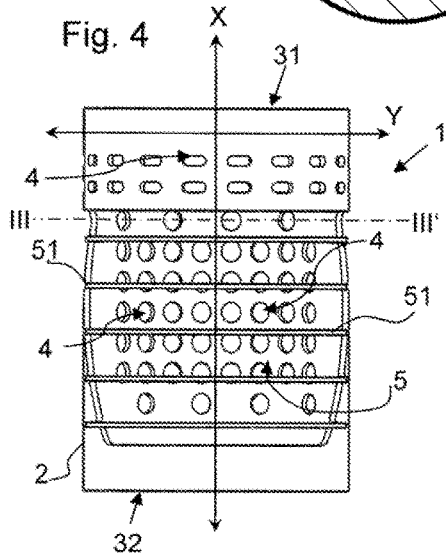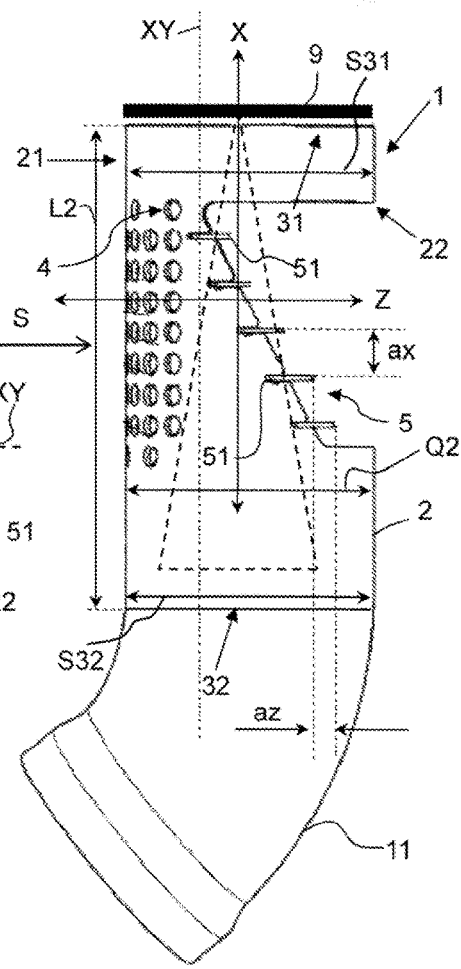

MIXER IN AN EXHAUST GAS SYSTEM

CROSS-REFERENCE TO RELATED APPLICATIONS

This application is a U.S. National Phase of International Application No. PCT/EP2016/062180, filed May 30, 2016 and published in German as WO 2016/193221 A1 on Dec. 8, 2016. This application claims the priority to German Patent Application No. 10 2015 108 655.7, filed on Jun. 1, 2015. The entire disclosures of all of the above applications are incorporated herein by reference.

FIELD

The disclosure refers to a static mixer for use in the exhaust system of a combustion engine and for the mixing of an additive injected into an exhaust system, and a system consisting of a mixer and at least one housing part of an initial converter of an exhaust system. The mixer consists of a tubular housing encircling a central axis X. The housing comprises an inlet opening at the end in the direction of central axis X and at the opposite end an outlet opening, whereby the inlet opening is used to supply the injected additive. In the area of the inlet opening and in the area of the outlet opening, the housing is closed in peripheral direction around the central axis X, i.e. the edge stays closed independent of a possible perforation in the circumferential closed edge.

Such type-consistent mixers used for exhaust gas guiding and exhaust gas after-treatment are familiar, state-of-the-art technology.

BACKGROUND

This section provides background information related to the present disclosure which is not necessarily prior art.

In the DE 20 2007 010 324 U1, a mixing tube is described which is open upstream and downstream on both sides of the central axis X. Within the tube, no guide elements or mixing elements are arranged.

An exhaust system with a longitudinal axis overflow tube which comprises certain properties of a static mixer is known from the DE 10 2012 021 017 A1. This overflow tube has a shell surface and an initial, flow-tight end, whereby in the shell surface adjacent to the flow-tight end, an inlet opening is provided in radial direction. The overflow tube is accommodated with its flow-tight end and the inlet opening in an initial exhaust gas guiding element. The reducing agent injected by an injection unit can be introduced through nozzles into the first exhaust gas guiding element.

In the DE 10 2011 120 685 A1, an exhaust tract for a vehicle is described with an inlet, via which a reducing agent for exhaust gas after-treatment can be introduced using an injector, whereby downstream of the inlet, a mixing device is arranged for mixing the reducing agent with the exhaust gas.

In the DE 11 2012 000 035 T5, a device for mixing an aqueous reducing agent solution for the addition of an aqueous reducing agent solution to exhaust gas is described, whereby the device for mixing an aqueous reducing agent solution is arranged between a filter, which traps particulate matter contained in the exhaust gas, and a reduction catalyst, which reduces and processes nitrogen oxide in the exhaust gas.

SUMMARY

This section provides a general summary of the disclosure, and is not a comprehensive disclosure of its full scope or all of its features.

The disclosure is based on the need to create and arrange a static mixer so that it generates little counterpressure, guarantees rapid and complete reducing agent processing and at the same time is resistant to production tolerances.

According to the present disclosure, the object is solved in that the housing, in relation to an XY plane orientated parallel to the central axis X of the mixer and at right angles to a main flow direction S, forms a tubular segment upstream of the XY plane featuring several openings as perforations in radial direction to the central axis X and forms a tubular segment downstream or in main flow direction S behind the XY plane, which compresses a recess in which several guiding plates are arranged.

The counterpressure of the mixer is reduced through the perforation in the part of the mixer tube, which is orientated towards the exhaust gas flow and arranged upstream of the XY plane. In particular, it is advantageous that the exhaust gas flow can move into the mixer from both sides, behind and in front of the XY plane. In the tube segment of the mixer positioned downstream of the XY plane, separately produced guiding plates are inserted into the housing. Above and below the recess, the housing features a closed edge in circumferential direction around the central axis X.

This mixer disclosure can be supplied with additives in liquid and/or gaseous form.

The axial direction and the radial direction as well as the circumferential direction refer to the central axis of the mixer unless stated otherwise.

It can also be advantageous for a complete reducing agent preparation if the guiding plates are arranged consecutively at a distance ax in axial direction and offset at a distance az in radial direction. The radial direction corresponds to direction Z, at right angles to the XY plane. This staircase-like arrangement also favours simple production tolerances because each guide plate can be inserted individually.

With regard to the full mixing of the reducing agent, it is advantageous if the guiding plates cover between 80% and 100% of the flow cross-section of the downstream tubular segment. Here, the sum of the guide plate areas which extend in radial direction and which do not overlap in axial direction forms between 80% and 100% of the flow cross-section.

It can also be advantageous, due to the thermomechanical loads on the guiding plates, if the guiding plates do not exclusively consist of flat and straight pieces of metal sheet, but also or alternatively consist of corrugated/wavelike and/or angled metal plates, which are inserted into the housing and joint positively to the housing. The positive joint prevents the clapping of the guiding plates in the exhaust gas flow. A wavelike and/or angled shape is advantageous for the compensation of temperature-related length changes in the guiding plates.

Here, it is also possible and advantageous if the guiding plates are arranged parallel to each other and at right angles to the central axis X or at right angles to an injection direction. In case of right-angled arrangement in relation to the central axis X, an injection flow runs parallel to central axis X. In the design examples in which an injection flow does not run parallel to the central axis X, the guiding plates can either be aligned at right angles to central axis X or at right angles to the injection direction.

It can be of particular importance for a low counterpressure if further openings are provided in the downstream tubular segment adjacent to the recess, which form a perforation. The perforations are provided in the area in which the housing or the edge of the housing is closed. Through the perforations in the upstream tubular segment and through the perforations in the downstream tubular segment, the counterpressure, which is generated through the mixer in the exhaust gas flow, can be reduced depending on the assembly situation of the mixer.

In the context of the disclosure design and arrangement, it may be of advantage if the housing in axial direction features a constant housing cross-section Q2 at least in the area of the perforations and downstream of the perforations. A tubular housing is easy and inexpensive to produce.

With regard to a simple geometry, it can also be advantageous if the inlet opening features a flow cross-section which is the same as or smaller than the flow cross-section of the outlet opening. This creates properties similar to those of a tube. In special applications, the ratios between the two openings at the inlet and outlet can be larger or smaller. A conically-shaped housing may also be possible.

Furthermore, advantageous is a system consisting of a mixer and at least one housing part of a first converter or filter of an exhaust system with a longitudinal axis, whereby the housing part is designed as a hood to form a flow duct in which the mixer is located and which at least in part guides the flow around the mixer. Due to the flow through the tube wall through the perforations and the recess in accordance with the disclosure, the construction of the mixer allows arrangement in an end section or rather in a hood of a converter or filter. The application in an end section is possible as well in case of a converter or filter arranged upstream of the mixer and in case of a converter or filter arranged downstream of the mixer because such converters or filters can be connected through an appropriate end section due to them having a larger diameter than an exhaust gas line. In such cases, the hood forms a flow duct tapering away from the converter or filter towards the exhaust pipe.

Furthermore, a system can be of advantage in which a first converter or filter is arranged upstream of the mixer with a housing, whereby the housing of the converter or filter is directly or indirectly connected to the housing of the mixer. The mixer and housing of the converter or filter form a building unit, in which the central axis X is advantageously arranged at an angle $\alpha$ between 75° and 90° to the longitudinal axis of the first converter.

After all, it can be advantageous if the mixer forms an exhaust pipe downstream of the perforation or is housed in a separate tube. The flow direction in the mixer runs at an angle of between approximately 75° and 90° to the main flow direction S. Due to the cylindrical construction, the mixer extension can serve as the exhaust pipe. The part serving as the exhaust pipe has neither perforations nor other recesses. A separate tube would be provided additional to the housing part, and fastened to this housing part.

It can be advantageous for the use of the mixer if the mixer is connected via the exhaust pipe or the tube downstream with a further converter or filter in which the introduced reducing agent takes effect.

In addition, it can be of advantage if additive in axial direction, directly in front of the inlet opening, an injector unit is provided for an additive of which the injection direction is aligned coaxially to the central axis X or at an angle between 5° and 90° to central axis X, or the additive can be introduced through the inlet opening of the mixer.

Ultimately, it can be advantageous for a reduction in counterpressure if the sum QF calculated of the cross-section areas of the openings and the cross-section area of the flow ducts between the mixer and the housing part in proportion to the flow cross-section of the outlet opening equals a value QV with QV=QF/S32, whereby the following applies: $0.5<QV<3$.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and details of the disclosure are presented in the patent claims and in the description and in the figures. It shows:

FIG. 1 shows a schematic sketch of a housing for a mixer and its geometry referring to an XYZ coordinate system;

FIG. 2 shows a perspective view of a mixer on the XZ plane with subsequent exhaust pipe and mounted injector unit;

FIG. 3 shows a plan view onto a cross-section view of a mixer according to FIG. 4 without injector unit;

FIG. 4 shows a perspective view of a mixer on the XY plane without injector unit;

Corresponding reference numerals indicate corresponding parts throughout the several views of the drawings.

DETAILED DESCRIPTION

Figure 5:
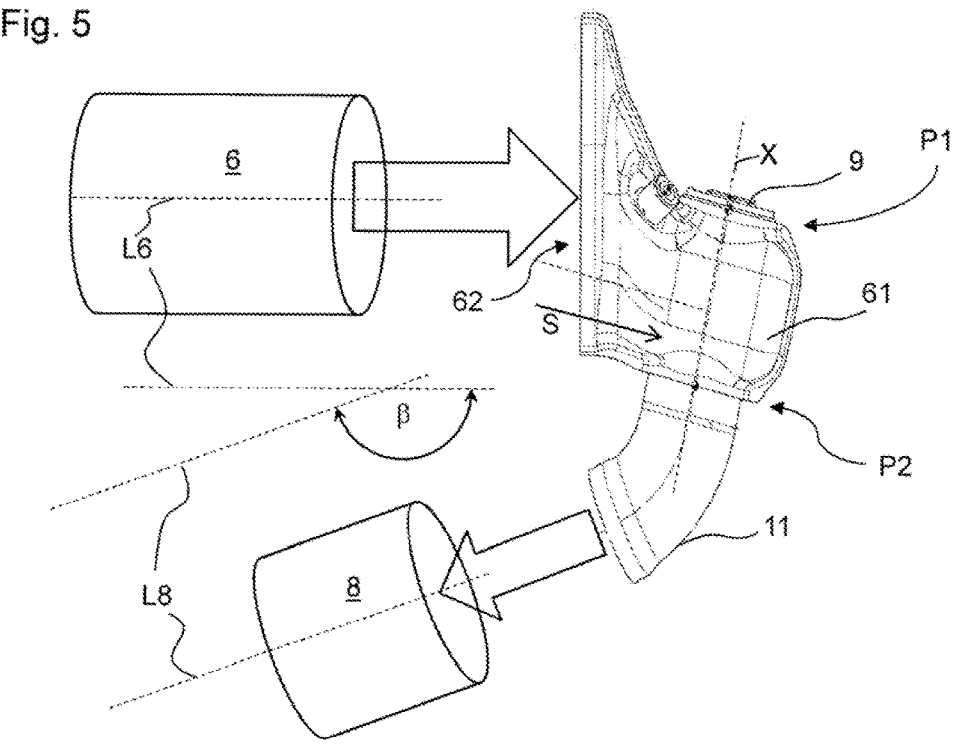
FIG. 5 shows a schematic sketch of a system consisting of a mixer according to FIG. 2, a housing part, a DPF and a DOC.

Example embodiments will now be described more fully with reference to the accompanying drawings.

The mixer 1 according to the disclosure features, as shown in FIG. 1, certain physical characteristics presented relative to a Cartesian coordinate system XYZ. The single-part housing 2 of mixer 1 extends along central axis X with a sheath surface encircling a YZ plane, which is divided into two tubular segments 21 and 22. Both tubular segments 21 and 22 mainly run at right angles to a flow direction S and together form housing 2 in plane XY.

Housing 2 features a radius r2, which is constant according to this design example across the entire length L2 of housing 2. This constant radius r2 means that an inlet opening 31 and an outlet opening 32 arranged opposite each other in the direction of central axis X have an identical flow cross-section S31, S32 to the housing cross-section Q2.

FIG. 2 shows a perspective view of a mixer 1, formed from housing 2. The housing 2 features in the area of tubular segment 22 a recess 5 which partially circulates the entire tubular segment 22. In housing 2 in the area of recess 5, several guiding plates 51 are arranged which run parallel to each other in the direction of the Y axis. In addition, the guiding plates 51 are arranged offset to each other in the direction of the central axis X by a distance ax and in the direction of the Z axis by a distance az. The layout and geometry, in particular regarding the segmenting of housing 2 in both tubular segments 21, 22 and the guiding plates 51 are shown as a schematic in FIG. 3 as a representation from above according to cut in FIG. 4. The flow cross-section S22 of the tubular segment 22 is shown as an area of slanted lines. Through the guiding plates 51, the injected additives are swirled around and deflected in the direction of the Z axis and mixed with the exhaust gas flow streaming in also in the direction o the Z axis through the openings 4 and through the recess 5.

In the part of the housing 2 defined the through tubular segment 21, openings 4 are provided in the form of a perforation through which an exhaust gas flow can stream into the housing 2. Upwards, an injector unit 9 is mounted onto housing 2 through which an additive can be injected into the exhaust gas flow. Downwards, housing 2 is extended through exhaust pipe 11.

As shown in FIG. 4, in this design example not only openings 4 in the area of tubular segment 21 opposite recess 5, but also further openings 4 in the direction of central axis X over recess 5 in both tubular segments 21, 22 are provided.

Figure 6:
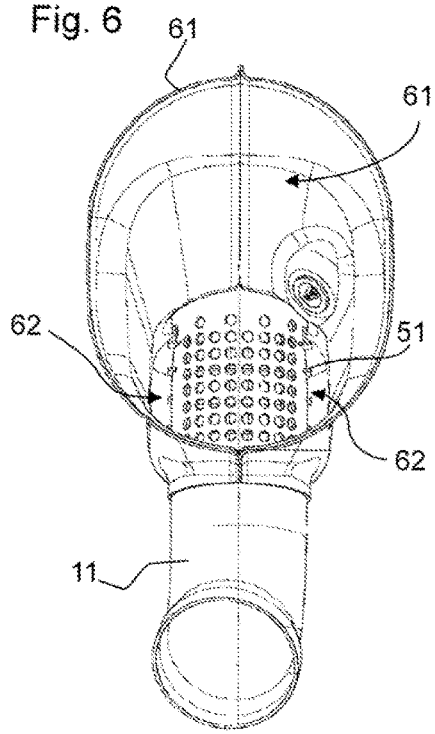
FIG. 6 shows an initial perspective view of the mixer with housing part according to FIG. 5.
Figure 7:
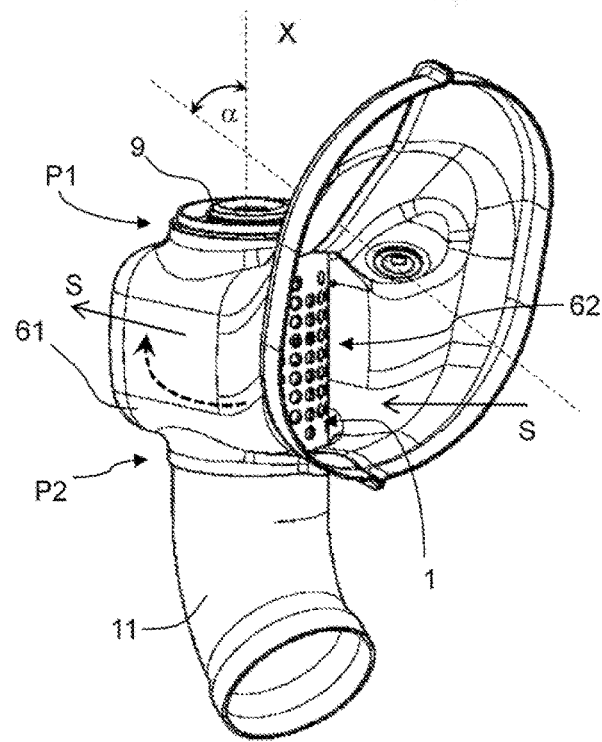
FIG. 7 shows a second perspective view of the mixer with housing part according to FIG. 5.

FIG. 5 shows a system consisting of a mixer 1 which is extended by an exhaust pipe 11 and accommodated in a housing part 61. An exhaust gas flow streams through a converter 6, designed in this example as a catalytic converter, into the flow duct 62 formed by housing part 61. Housing part 61 encases mixer 1 in such a way that mixer 1 is stored in the direction of central axis X at two positions P1 and P2 in the housing part 61. Between the two positions P1 and P2, the housing part 61 forms two flow ducts 62, which guide the flow around mixer 1. As shown in more detail in FIGS. 6 and 7, the exhaust gas flow in flow duct 62 is both introduced into mixer 1 and guided around mixer 1 via flow duct 62. The exhaust gas flow guided between the housing part 61 and mixer 1 through the flow ducts 52 around mixer 1 is represented by a dashed arrow in FIG. 6. The exhaust gas flowing through the openings 4 into mixer 1 mixes with the exhaust gas initially flowing around mixer 1 and then through recess 5 into mixer 1. The exhaust gas flow located in mixer 1 is mixed with the injected additives. The entire exhaust gas flow streams after unification and mixing from the outlet opening 32 out of the mixer 1 and into exhaust pipe 11. After exiting the exhaust pipe 11, the exhaust gas flow streams through a converter 8, depicted in this design example as a particle filter, with a longitudinal axis L8.

From the converter 6 exit to the inlet into converter 8, the exhaust gas flow is diverted by an angle β of between 140° and 160°. For this purpose, an initial deflection takes place due to the layout of the central axis X to the longitudinal axis L6 of the converter 6, which are inclined towards each other at an angle α of 110°.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A static mixer in an exhaust system for a combustion engine and for the mixing of an additive injected into the exhaust system, comprising:
a tubular housing encircling a central axis, the housing comprising an inlet opening at an end in a direction of the central axis and at an opposite end an outlet opening, wherein the inlet opening is used for the supply of additive injected into the exhaust system, the housing including a first circumferential closed edge at the end and a second circumferential closed edge at the opposite end, wherein the housing in relation to a plane orientated parallel to the central axis and at right angles to a main flow direction forms a tubular segment upstream of the plane featuring several openings in a radial direction to the central axis as perforations and forms a tubular segment downstream or in the main flow direction behind the plane, which comprises a recess in which several guiding plates are arranged, wherein the main flow direction is essentially at right angles to the central axis and the openings are opposite to the recess in regards to the main flow direction.

2. The mixer according to claim 1, wherein
the guiding plates are arranged consecutively in an axial direction and in a radial direction offset with a distance.

3. The mixer according to claim 2, wherein
the guiding plates cover between 80% and 100% of a flow cross-section of the downstream tubular segment.

4. The mixer according to claim 1, wherein
the guiding plates are formed from levelled and straight or corrugated/wavelike and/or angled plates, which are inserted into the housing and joined positively to the housing.

5. The mixer according to claim 1, wherein
the guiding plates are arranged parallel to each other and at right angles to the central axis or at right angles to an injection direction.

6. The mixer according to claim 1, wherein
further openings are provided in the downstream tubular segment adjacent to the recess which form further perforations.

7. The mixer according to claim 6, wherein
the housing in an axial direction features a constant housing cross-section at least in an area of the further perforations and downstream of the further perforations.

8. The mixer according to claim 1, wherein
the inlet opening features a flow cross-section which is the same as or smaller than a flow cross-section of the outlet opening.

9. A system consisting of a mixer according to claim 1, and at least one housing part of a first converter of the exhaust system with a longitudinal axis, wherein the housing part is designed as a hood to form a flow duct in which the mixer is located and which at least in part guides an exhaust flow around the mixer.

10. The system according to claim 9, wherein
the first converter is arranged upstream of the mixer, wherein the housing part is directly or indirectly connected to the housing of the mixer.

11. The system according to claim 9, wherein
the central axis is arranged at an angle α between 75° and 90° to the longitudinal axis of the first converter.

12. The system according to claim 9, wherein
the mixer forms an exhaust pipe downstream of the perforations or is housed in a separate tube.

13. The system according to claim 12, wherein
the exhaust pipe or the tube is connected downstream to a further converter.

14. The system according to claim 9, wherein
in an axial direction, directly in front of the inlet opening, an injector unit is provided for the additive, of which an injection direction is aligned coaxially to the central axis or at an angle between 5° and 90° to the central axis, or the additive can be introduced through the inlet opening of the mixer.

15. The system according to claim 9, wherein
a sum of the cross-section areas of the openings in the radial direction and a cross-section area of the flow duct between the mixer and the housing part divided by a flow cross-section of the outlet opening equals a value, whereby the following applies: 0.5<value<3.

* * * * *